(12) United States Patent
Drewes (10) Patent No.: US 9,651,104 B2
(45) Date of Patent: May 16, 2017

(54) BRAKE DISC ARRANGEMENT FOR DISC BRAKES

(71) Applicant: SAF-HOLLAND GmbH, Bessenbach (DE)

(72) Inventor: Olaf Drewes, Aschaffenburg (DE)

(73) Assignee: SAF-HOLLAND GmbH, Bessenbach (DE)

(*) Notice: Subject to any disclaimer, the term of this patent is extended or adjusted under 35 U.S.C. 154(b) by 0 days.

(21) Appl. No.: 14/388,116

(22) PCT Filed: Mar. 28, 2013

(86) PCT No.: PCT/EP2013/056651
§ 371 (c)(1),
(2) Date: Sep. 25, 2014

(87) PCT Pub. No.: WO2013/149928
PCT Pub. Date: Oct. 10, 2013

(65) Prior Publication Data
US 2015/0053515 A1  Feb. 26, 2015

(30) Foreign Application Priority Data

Apr. 3, 2012  (DE) .................. 10 2012 205 410

(51) Int. Cl.
F16D 65/02  (2006.01)
F16D 65/12  (2006.01)
F16D 65/00  (2006.01)

(52) U.S. Cl.
CPC ....... F16D 65/123 (2013.01); F16D 65/0043 (2013.01); F16D 65/12 (2013.01);
(Continued)

(58) Field of Classification Search
USPC .................................. 188/218 XL
See application file for complete search history.

(56) References Cited

U.S. PATENT DOCUMENTS 2,587,062 A * 2/1952 Newell .................. 403/388
3,699,637 A * 10/1972 Rosiek .................. 29/432.1
(Continued)

FOREIGN PATENT DOCUMENTS

CN    101855467    10/2010
CN    102239345    11/2011
(Continued)

OTHER PUBLICATIONS

European Patent Office, International Search Report, Jul. 25, 2013.

*Primary Examiner* — Thomas J Williams
*Assistant Examiner* — James Hsiao
(74) *Attorney, Agent, or Firm* — Price Heneveld LLP (57) ABSTRACT

A brake disc arrangement for disc brakes comprising a friction ring, a mounting adapter for mounting the brake disc arrangement on a wheel hub, at least one connecting element for connecting the friction ring and the mounting adapter, and at least one contour having a friction ring-side and an adapter-side contour region, wherein the contour is shaped along a longitudinal axis by recesses in the friction ring and the mounting adapter running perpendicular to a rotational axis of the brake disc arrangement, wherein the connecting element may be brought from a first state where the connecting element is arranged inside the contour and a second state where the outer diameter of the connecting element is enlarged, such that the connecting element is connected to the friction ring-side and/or the adapter-side contour region by form fit and/or friction fit.

16 Claims, 8 Drawing Sheets

(52) U.S. Cl.
CPC .. *F16D 2065/134* (2013.01); *F16D 2065/136* (2013.01); *F16D 2065/1316* (2013.01); *F16D 2065/1356* (2013.01); *F16D 2065/1392* (2013.01); *F16D 2250/0084* (2013.01); *Y10T 29/49947* (2015.01)

(56) References Cited

U.S. PATENT DOCUMENTS

| | | | | |
|---|---|---|---|---|
| 3,729,067 | A * | 4/1973 | Buyze | 188/18 A |
| 3,754,624 | A * | 8/1973 | Eldred | 188/71.5 |
| 3,926,285 | A * | 12/1975 | Preller et al. | 188/218 XL |
| 3,994,370 | A * | 11/1976 | Gebhardt et al. | 188/218 XL |
| 4,026,393 | A * | 5/1977 | Gebhardt et al. | 188/218 XL |
| 4,132,294 | A * | 1/1979 | Poli | 188/218 XL |
| 4,280,597 | A * | 7/1981 | Schorwerth | 188/218 XL |
| 4,280,598 | A * | 7/1981 | Pollinger | 188/218 XL |
| 4,440,274 | A * | 4/1984 | Claydon | 188/328 |
| 4,848,521 | A * | 7/1989 | Izumine | 188/18 A |
| 4,967,893 | A * | 11/1990 | Vogele | 192/107 R |
| 5,429,214 | A * | 7/1995 | Wiebelhaus et al. | 188/218 XL |
| 5,520,269 | A * | 5/1996 | Yamamoto et al. | 188/218 XL |
| 5,823,303 | A * | 10/1998 | Schwarz et al. | 188/218 XL |
| 6,131,710 | A * | 10/2000 | Power | 188/330 |
| 6,195,863 | B1 * | 3/2001 | Blake | 29/239 |
| 7,467,694 | B2 * | 12/2008 | Botsch | 188/218 XL |
| 8,733,518 | B1 * | 5/2014 | Ruiz | 188/218 XL |
| 2003/0159893 | A1 * | 8/2003 | Tironi | 188/71.1 |
| 2004/0149525 | A1 * | 8/2004 | Gotti et al. | 188/17 |
| 2004/0173418 | A1 * | 9/2004 | Saame et al. | 188/17 |
| 2007/0215418 | A1 * | 9/2007 | Wirth et al. | 188/218 XL |
| 2011/0162925 | A1 * | 7/2011 | Mueller | 188/218 XL |
| 2011/0259682 | A1 * | 10/2011 | Mueller | 188/218 XL |
| 2011/0278115 | A1 * | 11/2011 | Drewes | 188/218 XL |
| 2013/0175125 | A1 * | 7/2013 | Forster et al. | 188/218 XL |
| 2014/0158486 | A1 * | 6/2014 | Schorn et al. | 188/218 XL |
| 2014/0224602 | A1 * | 8/2014 | Saame et al. | 188/218 XL |

FOREIGN PATENT DOCUMENTS

| | | |
|---|---|---|
| DE | 28 24 676 | 12/1978 |
| DE | 29 05 385 | 8/1980 |
| DE | 19858244 | 6/2000 |
| DE | 103 22 454 | 2/2004 |
| DE | 10 2007 001 211 | 7/2008 |
| DE | 10 2008 021 625 | 11/2008 |
| DE | 10 2008 035 750 | 2/2010 |
| DE | 102008035750 | 2/2010 |
| DE | 10 2008 061 915 | 6/2010 |
| EP | 0 014 483 | 8/1980 |
| EP | 0014483 | 8/1980 |
| EP | 1227261 | 7/2002 |
| WO | 2010/063 831 | 6/2010 |

* cited by examiner

BRAKE DISC ARRANGEMENT FOR DISC BRAKES

BACKGROUND OF THE INVENTION

The present invention relates to a brake disc arrangement for disc brakes, for example of land vehicles (such as passenger vehicles, trucks, commercial vehicles or utility vehicles or trailers) as well as a method of manufacturing a brake disc arrangement for disc brakes, also for land vehicles in particular.

Brake disc arrangements of the type in question are well known in the prior art. In most cases, they are designed one-piece, formed of a friction ring and a mounting adapter. "Friction ring" means the actual brake disc, which serves to achieve the braking effect by means of respective brake pads. The mounting adapter in turn is provided in order to connect the friction ring and the wheel hub etc. In the known designs, the friction ring is cast onto the mounting adapter such that the friction ring may expand radially and, thus, an opening-up of the friction ring may be avoided, for example when the latter is subject to great variations in temperature. In further known designs, there are arranged additional connecting elements between the friction ring and the mounting adapter, onto which the friction ring and the mounting adapter are cast. Due to the complex manufacturing process, however, finishing work on such brake disc arrangements is necessary, wherein there is the danger that this causes notches, which are in critical regions. Additionally, this process step increases the manufacturing costs. Furthermore, such brake disc arrangements are limited to manufacturing processes by casting, which due to the complexity of the component and its safety-relevant properties are very difficult to control.

Therefore, the object underlying the present invention is to provide a brake disc arrangement for disc brakes, in particular for land vehicles, as well as a method of manufacturing a brake disc arrangement for disc brakes, in particular for land vehicles, by means of which the operational safety of the brake disc arrangement is improved and the manufacturing process may be simplified and the production costs may be reduced.

SUMMARY OF THE INVENTION

According to the invention, the brake disc arrangement for disc brakes, in particular for land vehicles, comprises a friction ring, a mounting adapter for mounting the brake disc arrangement on a wheel hub, at least one connecting element for connecting the friction ring and the mounting adapter, and at least one contour having a friction ring-side and an adapter-side contour region, in which the contour is shaped along a longitudinal axis by means of recesses in the friction ring and the mounting adapter running perpendicular or transverse to a rotational axis of the brake disc arrangement, wherein the connecting element can be brought from a first state into a second state, wherein the connecting element in the first state is designed such that it can be arranged inside the contour, and wherein the outer diameter of the connecting element in the second state is enlarged relative to the first state perpendicular or transverse to the longitudinal axis, at least in sections, in such a manner that the connecting element is connected to the friction ring-side and/or the adapter-side contour region by form fit and/or friction fit. The brake disc arrangement in particular serves for being arranged on land vehicles, such as passenger vehicles, trucks, trailers, truck-trailer combinations or the like, however, it is not limited to the above list. Particularly expediently, the brake disc arrangement is provided for a utility vehicle. The brake disc arrangement is adapted to be indirectly or directly fastened with the wheel or a wheel hub, so that it rotates together with the wheel. A brake lining, which is provided in a brake caliper spanning the friction ring, may be pushed or urged or pressed from both sides against the friction ring in order to brake the wheel. Preferably, the friction ring may be solid (i.e. without venting channels or circulation space), or particularly preferably, it may be an internally vented friction ring (with circulation space or ventilation chamber). Further preferably, the brake disc arrangement comprises a mounting adapter, which is adapted to fix the brake disc arrangement to a wheel hub. It may be mounted indirectly via intermediate elements or directly on the wheel hub. As a matter of course, the mounting adapter may have a pot-shaped section, which can be connected to the wheel or the wheel hub. The actual connection of the friction ring and the mounting adapter can preferably be made by the connecting element. Preferably, the connecting element can be configured as a hollow pin or bolt, which is closed on one side, wherein radially about the rotational axis, there are preferably provided 8 to 12 connecting elements, particularly preferably 10 connecting elements. Preferably, the connecting elements lie in one plane transverse to the rotational axis, wherein the arrangement thereof in the plane is preferably irregular, particularly preferably regular. Most preferably, the arrangement is concentric and regularly distributed along the circumference radial to the rotational axis. In further preferred embodiments, at least one connecting element may have an offset relative to said plane in the direction of the rotational axis. Preferably, the longitudinal axis, in the direction of which the connecting element extends, further runs in the radial direction to the rotational axis. Also preferably, the course of the longitudinal axis may also be inclined relative to the rotational axis. The contour, in which the connecting element can be arranged, can preferably be formed of the friction ring-side and the adapter-side contour regions. The recesses in the friction ring-side and in the adapter-side contour regions running transverse to the rotational axis preferably can be configured as openings having a longitudinal extension in the direction of the longitudinal axis running transverse to the rotational axis. As a matter of course, the friction ring-side and the adapter-side contour regions are formed such that for example the brake functionality of the friction ring is not negatively influenced. As a matter of course, the number and arrangement of the contours corresponds to the number and arrangement of the connecting elements. Advantageously, the connecting element has two states, wherein the first state is such that the connecting element can be arranged in the contour. To put it differently, the connecting element in the first state may be arranged in the contour manually or with the help of a suitable process and/or a suitable device. The connecting element or the outer geometry thereof can be expanded by applying an inner pressure within the connecting element, which makes it possible to produce the form fit and/or friction fit with the contour so that the connecting element is in its second state. Preferred techniques for this are internal high pressure forming or hydro-mechanical deep-drawing, for example. The low level of temperature used during this forming process, which is significantly below the level of temperature used in manufacturing by casting, is of great advantage. This reduces the danger of negatively influencing adjacent or surrounding components during the manufacturing process of the brake disc arrangement, such as by thermal distortion. A further great advantage is that the friction ring and the mounting adapter need not be cast around the connecting element, since the connecting element can be arranged in the contour formed in the friction ring and the mounting adapter due to the fact that two states are possible. This leads to additionally new degrees of freedom when choosing the material for manufacturing the friction ring and the mounting adapter, such as non-casting materials, too. Preferred brake disc arrangements may be completely finished both before the forming process of the connecting element and thereafter. Preferred materials for the connecting element are high-strength VA steels or stainless steels, since VA steel, on the one hand, has good corrosion resistance and, on the other hand, offers a high degree of deformation. It is of great advantage that the friction ring and the mounting adapter can be manufactured completely separately and independently of each other. This leads also to a large variety of shapes and materials. Preferred friction ring materials are casting materials as well as ceramic and composite materials. Particularly preferably, the friction ring and/or the mounting adapter are made from nodular graphite cast iron.

Expediently, the cross-section of the contour is round and/or constant along the longitudinal axis. Preferred geometries are such that a good form fit and/or friction fit with the connecting element can be produced. Preferably, the cross-section of the contour can also be angular or pointed or acute. Further preferably, the contour along the longitudinal axis or transverse to the rotational axis of the brake disc arrangement is also not constant or constant only in sections. Preferred embodiments are conically expanding or tapering along the longitudinal axis, for example. Also an alternating increase and/or decrease of the inner diameter of the contour along the longitudinal axis is preferred. Further preferably, the contour or the adapter-side and/or the friction-side contour regions are such that a good axial movability of the connecting element in the respective contour region can be supported in the second state of the connecting element. Thus, advantageously, also the form fit and/or friction fit between the respective contour region and the connecting element can be purposefully reduced by means of recesses in the contour region, which run transverse to the longitudinal axis of the contour region, for example.

Preferably, the contour along the longitudinal axis is limited by the friction ring and/or the mounting adapter such that the connecting element is not further displaceable within the contour in the first state at least in one direction of the longitudinal axis. To put it differently, the recess forming the adapter-side or the friction ring-side contour region is limited transverse to the rotational axis or along the longitudinal axis so that the connecting element is not further movable along the longitudinal axis. To this end, it is preferred that transverse to the longitudinal axis in the contour a further stop or a wall can be provided, to which the connecting element may attached. Expediently, the connecting element may rest against said stop or said wall during the forming process. The region, which forms the limitation or the wall, need not be continuously closed, but may have holes, gaps or slits towards the environment, also towards the venting channels of the friction ring, for example. To put it differently, in preferred embodiments, there is preferably only a limitation in certain sections.

Further preferably, the friction ring-side and/or the adapter-side contour region has at least one opening region, wherein the opening region is configured as an opening in the friction ring and/or in the mounting adapter, which opening is formed such that in the first state the connecting element can be guided therethrough and be arranged in the contour. In preferred embodiments, the adapter-side contour region is expanded along the longitudinal axis in the direction of the rotational axis such that the opening region can be formed in the direction of the rotational axis and is accessible therefrom. To put it differently, the opening region thus forms an extension of the adapter-side contour region in the direction of the rotational axis such that the adapter-side contour region becomes accessible from the direction of the rotational axis. In further preferred embodiments, the friction ring-side contour region is expanded towards the outside such that the friction ring-side contour region is accessible radially when seen from the outside. Alternatively preferably, also the friction ring and/or the mounting adapter in the direction of the rotational axis and/or also inclined thereto may be provided with at least one opening region, configured as an aperture, for example, such that it is possible to arrange the connecting element through said opening region in the first state of the connecting element.

Expediently, the friction ring-side and/or the adapter-side contour region has at least one access region, wherein the access region is formed as an opening in the friction ring and/or in the mounting adapter, which is formed to guide an operative medium and/or a tool to the contour and/or the connecting element so that the connecting element may be formed or shaped. In preferred embodiments, the friction ring-side contour region is extended in the direction of the rotational axis such that an access region can be formed. Further preferably, the access region can also be arranged in the adapter-side contour region or in the friction ring. The course of the access region further preferably can run in all spatial directions. It is decisive that an operative medium and/or a tool can be fixed to or arranged at the contour and/or the connecting element.

Preferably, the connecting element is formed as a hollow body with at least one opening, wherein the opening in the first state of the connecting element is accessible via the access region. Preferably, the opening is configured such that a tool and/or an operative medium can be arranged for the forming process of the connecting element. Expediently, the connecting element in the first state of the contour is arranged such that the opening of the connecting element is accessible via the access region of the contour.

Further preferably, the connecting element is formed as a cylindrical hollow body extending along the longitudinal axis, which hollow body is closed at one side. Further preferably, at least one outer edge of the connecting element is beveled or chamfered or provided with suitable radii so as to allow for an optimum displacement into the contour or so as not to damage the contour during the forming process. Preferably, the closed side of the connecting element is formed as a wall or bottom transverse to the longitudinal axis. Further preferably, said wall portion is also configured ball-shaped and/or pointed or projecting into the hollow body. In alternatively preferred embodiments, the wall portion itself also has a varying wall thickness. It is of advantage that the shape of the connecting element is found again in the geometry of the contour. It is also advantageous if the open side of the connecting element is adapted to a tool or an operative medium such that it can be easily arranged. To put it differently, for example the opening of the connecting element is circumferentially chamfered so as to be able to neatly apply a tool.

Furthermore, the wall thickness of the connecting element along the longitudinal axis is formed differently in certain sections. The transition in wall thickness along the longitudinal axis may be formed as a landing, particularly preferably, the transition is continuous. The connecting element may also have different wall thicknesses radially, at least in certain sections. The wall thickness itself is preferably adapted to the process factors of the forming process. This means that when during the forming process low pressures are used, for example, the wall of the connecting element may be or must be thinner so as to achieve a sufficient expansion as a result of the forming process. Further, the wall thickness is preferably dimensioned such that the connecting element with the adapter-side and/or the friction ring-side contour region produces a form fit and/or friction fit such that the axial movability of the parts relative to each other is maintained. Preferably, thus, due to the different wall thicknesses of the connecting element along the longitudinal axis, at least in certain sections, the form fit and/or friction fit can be adjusted. In a further preferred embodiment, the wall thickness of the connecting element can also be radially different, at least in certain sections. As a matter of course, the wall thickness of the connecting element along the longitudinal axis and/or radially may be dimensioned differently at least in certain sections. In a further preferred embodiment, the connecting element may be manufactured from a material, preferably a sintered metal, which has different material properties along the longitudinal axis, in particular with regard to the degree of deformation. Thus, basically the material properties or specifically the resistance to forming along the longitudinal axis of the connecting element and/or radially differ so that the form fit and/or friction fit can be adjusted. Thus, also the degree of deformation in certain sections and, thus, the form-fit and/or friction fit can be influenced by means of the material properties.

It is advantageous that the connecting element is arranged in the contour such that the wall thickness of the connecting element in the friction ring-side contour region is larger than in the adapter-side contour region. As a result of the different wall thickness, when the inner pressure is the same, for example, the connecting element in the friction ring-side contour region is less expanded than in the adapter-side contour region. The type of the form fit and/or friction fit of the connecting element with the contour is thus adjustable specifically and in certain sections. It may also be preferred to select for each connecting element or its combination with the contour a different procedure, which means, for example, that in one contour, there is an axial movability between the connecting element and the friction ring, that in a further connecting element of the brake disc arrangement, there is an axial movability between the connecting element and the mounting adapter.

Expediently, the connecting element in the second state is accommodated in the friction ring-side and/or the adapter-side contour region such that the connecting element is movable along the longitudinal axis in relation to the friction ring or to the adapter ring. A preferred embodiment allows for an axial movability of the connecting element in the friction ring-side contour region so that an opening-up of the friction ring can be prevented. Preferably, the connecting element is provided with different wall thicknesses along the longitudinal axis. Further preferably, the connecting element is provided with the same wall thickness, wherein the diameter and/or the inner geometries of the adapter-side and/or friction ring-side contour region along the longitudinal axis are differently configured. To put it differently, for example the inner diameter of the friction ring-side contour region can be configured larger than the inner diameter of the adapter-side contour region. Preferably, the inner diameter of the adapter-side contour region is for example approximately so large that the connecting element in the first state thereof can just be arranged above the opening region, on the adapter-side contour region, while the connecting element in the friction ring-side contour region transverse to the longitudinal axis still has a little clearance. To put it differently, thus, in the second state of the connecting element in the friction ring-side contour region between the connecting element and the friction ring-side contour region, there is a stronger or different form fit and/or friction fit than in the friction ring-side contour region. Thus, there can be an axial movability of the connecting element in the second state in the friction ring-side contour region. In further preferred embodiments, it may also be of advantage to allow for a movability of the connecting element within the contour transverse to the longitudinal axis. Preferably, thus, the form fit and/or friction fit may be adjusted by the diameter and/or the inner geometries of the adapter-side and/or friction ring-side contour region (along the longitudinal axis). In a further preferred embodiment, the connecting element has a coating at least in certain sections so that the movability thereof in the second state thereof in the contour becomes influenceable.

Preferably, due to the wall thickness, which varies along the longitudinal axis, and/or the different material properties of the connecting element (especially with regard to the resistance to forming) and/or due to the diameter, which differs along the longitudinal axis, and/or the different inner geometries of the friction ring-side and/or the adapter-side contour region, the form fit and/or friction fit of the connecting element with the contour along the longitudinal axis and also seen radially can be adjusted. It is possible that the form fit and/or friction fit along the longitudinal axis and/or also circumferentially or seen radially to the connecting element can be adjusted. The "adjustability" has to be understood in that the amount or strength of the form fit and/or friction fit can be adjusted, i.e. it may be adjusted, for example, to what extent there is axial and/or radial clearance, to put it differently, how "fixedly" the connecting element is arranged within the contour. The wall thickness and the material properties influence in particular the resistance to deformation or the resistance to forming vis-à-vis the inner pressure, so that the form fit and/or friction fit can be adjusted.

Expediently, the friction ring and the mounting adapter are arranged essentially concentric relative to each other about the rotational axis, wherein at least one friction ring-side contour region and at least one adapter-side contour region are arranged flush relative to each other such that a common contour is formed, within which the connecting element can be arranged.

In a further preferred embodiment, the contour along the longitudinal axis is limited neither by the friction ring nor by the mounting adapter. To put it differently, the contour is accessible also transverse to the rotational axis from both sides.

Alternatively preferably, the contour has at least one opening region, which is arranged in the plane extending essentially transverse to the rotational axis or inclined or also transverse relative thereto.

Preferably, at least one access region can be formed as one of the opening regions. To put it differently, the opening may be such that it may include both the function of access region and the function of opening region.

Preferably, the varying wall thickness of the connecting element counteracts an increased inner pressure in the connecting element such that the increase in diameter of the connecting element, transverse to the longitudinal axis, is different at the transition into the second state of the connecting element along the longitudinal axis. Here, the increase in the outer diameter of the connecting element may also be infinitesimally small and not visible to the naked eye.

Further according to the invention, there is provided a method of manufacturing a brake disc arrangement for disc brakes, in particular for land vehicles, comprising a friction ring, a mounting adapter and at least one connecting element, comprising the following steps:

provide the friction ring and the mounting adapter, wherein the friction ring and the mounting adapter each have at least one friction ring-side and at least one adapter-side contour region, which are suitable to form a common contour;

providing the connecting element, wherein the connecting element is in the first state;

bringing or shaping at least one connecting element arranged in or at the contour into the second state, making use of an access region such that the connecting element is connected to the friction ring-side and/or adapter-side contour region by form fit and/or by force fit, wherein the outer diameter of the connecting element in the second state is enlarged relative to the first state perpendicular or transverse to the longitudinal axis, at least in sections.

Preferably, due to a varying wall thickness along the longitudinal axis and/or due to different material properties of the connecting element and/or due to different diameters along the longitudinal axis and/or due to different inner geometries of the friction ring-side and/or adapter-side contour region, the form fit and/or friction fit can be adjusted. Internal high pressure forming or hydro-mechanical deep-drawing are preferably suitable for the forming process of the connecting element. The outer diameter of the connecting element can be expanded such that between the contour and the connecting element there may be produced a form fit and/or friction fit. It does not matter whether the friction ring and/or the mounting adapter are finished before or after the forming process of at least one connecting element.

A method is further preferred, which comprises the following additional steps:

arranging the friction ring and the mounting adapter relative to each other in a device such that at least one common contour is formed, which extends along the longitudinal axis;

arranging and displacing the connecting element into the contour via the opening region, wherein the connecting element expediently is arranged at the contour such that the wall thickness of the connecting element in the friction ring-side contour region is larger than in the adapter-side contour region.

In the preferred method, the friction ring and the mounting adapter are arranged before the connecting element is arranged.

A method is further preferred, which comprises the following additional steps:

arranging at least one connecting element in the friction ring-side or in the adapter-side contour region;

arranging the friction ring and the mounting adapter relative to each other in a device such that at least one common contour is formed, which extends along the longitudinal axis;

displacing the connecting element into the contour, wherein expediently the connecting element is arranged in the contour such that the wall thickness of the connecting element in the friction ring-side contour region is larger than in the adapter-side contour region.

Preferably, the connecting element is arranged in the friction ring-side or in the adapter-side contour region such that it is completely enclosed by the respective contour region. Thus, it becomes possible to align the friction ring or the mounting adapter only after the connecting elements have been arranged relative to each other. Once the connecting elements have been arranged in the adapter-side contour regions, preferably, they may be displaced into the friction ring-side contour regions by a common rotation of the mounting adapter and of the friction ring, for example, making use of the centrifugal force.

A method is further preferred, which comprises the following additional steps:

arranging the connecting element in the friction ring-side or in the adapter-side contour region;

arranging the friction ring and the mounting adapter relative to each other in the device such that the contour is formed by rotating the friction ring and/or the mounting adapter, wherein expediently, the connecting element is arranged in the contour such that the wall thickness of the connecting element in the friction ring-side contour region is larger than in the adapter-side contour region and wherein the connecting element is arranged such that it is no longer possible to rotate the friction ring and the mounting adapter relative to each other.

To put it differently, it is only by rotating the friction ring and the mounting adapter and by subsequently displacing the connecting element that the contour is formed, which is suitable for producing the form fit and/or friction fit with the connecting element.

Basically, displacing the connecting element may preferably be done manually and/or using a suitable device in the methods mentioned.

As a matter of course, all further features and advantages of the brake disc arrangement according to the invention may also be used in the method according to the invention for manufacturing a brake disc arrangement.

Further advantages and features become apparent from the following description of preferred embodiments of the brake disc arrangement according to the invention with reference to the appended Figures. Individual features of individual embodiments may be combined with each other within the framework of the invention.

DETAILED DESCRIPTION OF THE PREFERRED EMBODIMENTS

Figure 1A:
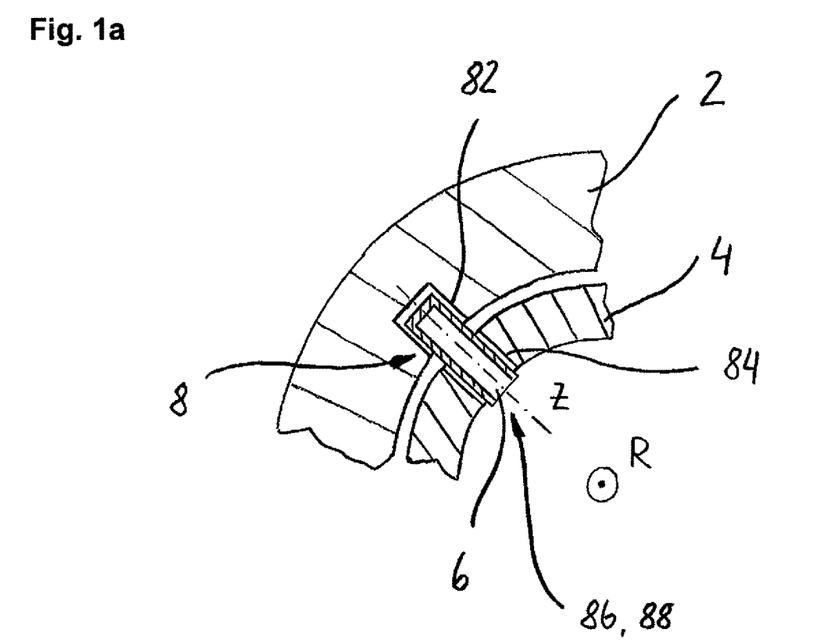
FIG. 1a shows a sectional view of a preferred embodiment of the brake disc arrangement in the first state.
Figure 1B:
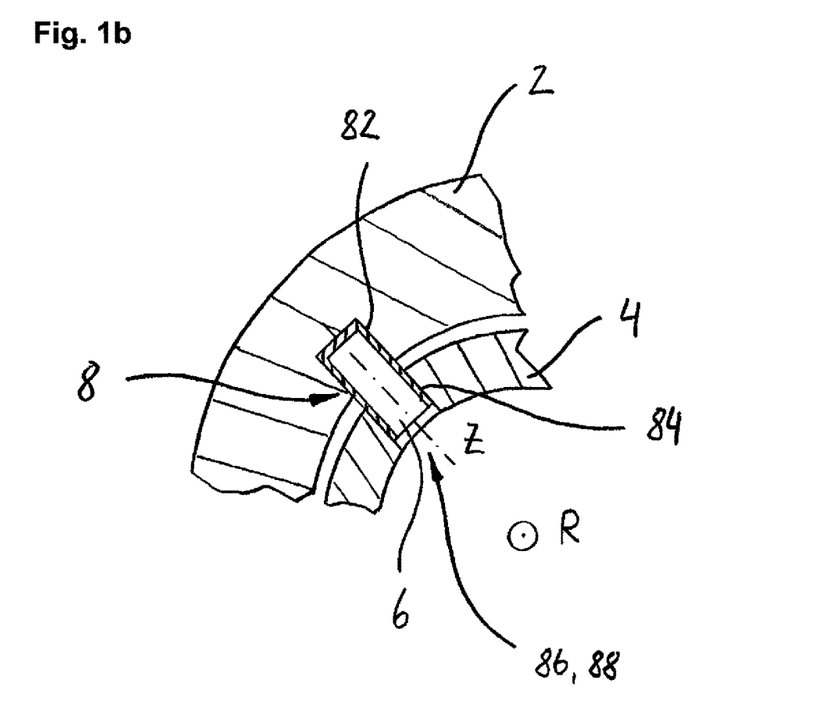
FIG. 1b shows a sectional view of the preferred embodiment of the brake disc arrangement in the second state.

FIG. 1a shows a preferred embodiment of the brake disc arrangement according to the invention. The friction ring 2 and the mounting adapter 4 are designed or oriented concentrically about the rotational axis R and essentially transverse thereto. The friction ring-side contour region 82 is formed as a recess in the friction ring 2. In the preferred embodiment, the adapter-side contour region 84 is formed as a continuous opening in the mounting adapter 4. The adapter-side contour region 84 together with the friction ring-side contour region 82 along the longitudinal axis Z forms the contour 8. FIG. 1a shows how the connecting element 6 in the first state thereof in a preferred embodiment may be positioned in the contour 8. In order to bring the connecting element 6 into this position, the opening region 86 is used. FIG. 1b shows accordingly that the opening region 86 simultaneously has the function of an access region 88. The connecting element 6 is sketched in the second state thereof in FIG. 1b. In contrast to FIG. 1a it is clearly visible that the connecting element in FIG. 1b is attached in the contour 8 such that, different from FIG. 1a, no clearance is visible any more between the connecting element 6 and the contour 8. To put it differently, in FIG. 1b, the second state of the connecting element 6 is shown, in which it has been expanded by a forming process such that the connecting element 6 forms a friction-fit and/or form-fit connection with the contour 8.

Figure 2:
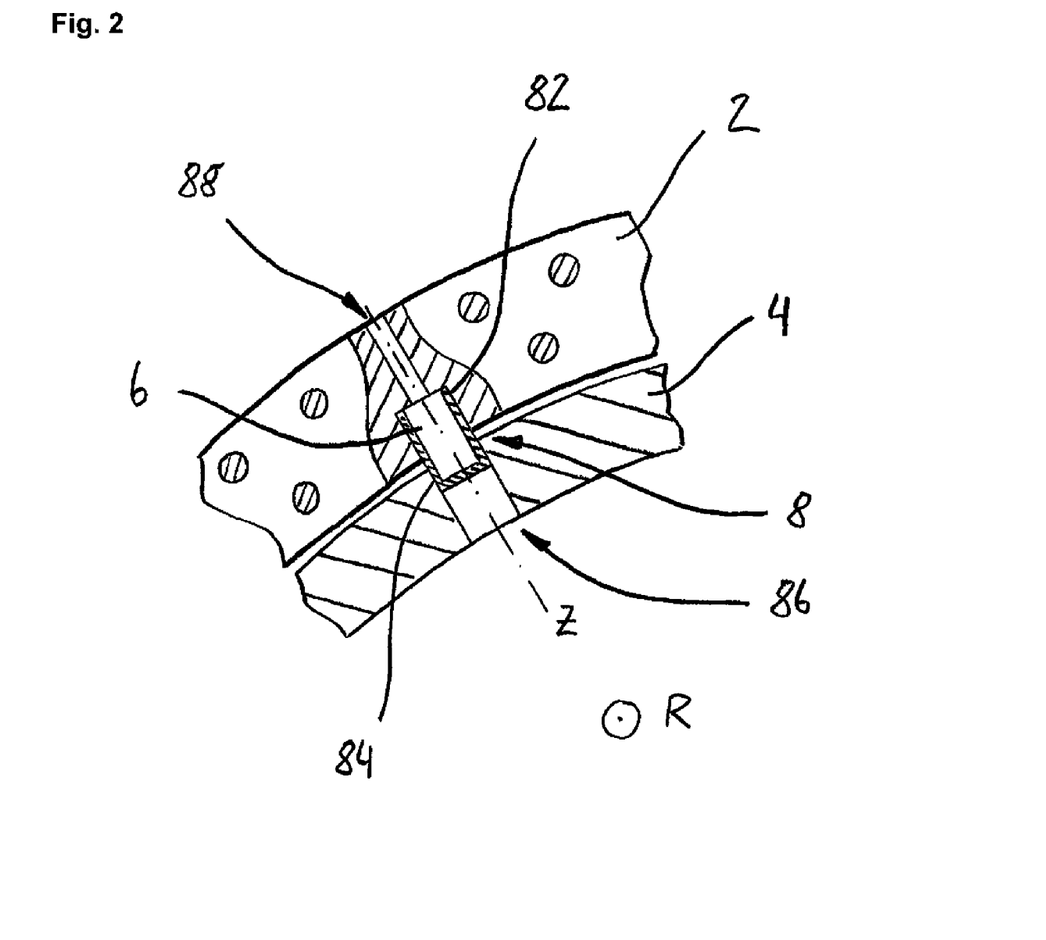
FIG. 2 shows a sectional view of a further preferred embodiment of the brake disc arrangement.

FIG. 2 shows a further preferred embodiment of the brake disc arrangement. The friction ring 2 and the mounting adapter 4 are arranged essentially concentric and essentially transverse to the rotational axis R. A preferred embodiment of the brake disc arrangement has a vented friction ring 2 in FIG. 2. Thus, a preferred embodiment is a internally vented disc brake. The connecting element 6 is shown in the second state. It is arranged in the contour 8, which is formed of the friction ring-side contour region 82 and the adapter-side contour region 84. In a preferred embodiment, the opening region 86 is not simultaneously configured as access region 88. The opening region 86 extends axially to the rotational axis R into the mounting adapter 4 and is formed such that the connecting element 6 in the first state thereof can be inserted into the contour 8. The access region 88, by contrast, is formed as an aperture in the friction ring 2 running axially to the rotational axis R. What is decisive for the forming process of the connecting element 6 is that the opening of the connecting element 6 can be reached via the access region 88.

Figure 3:
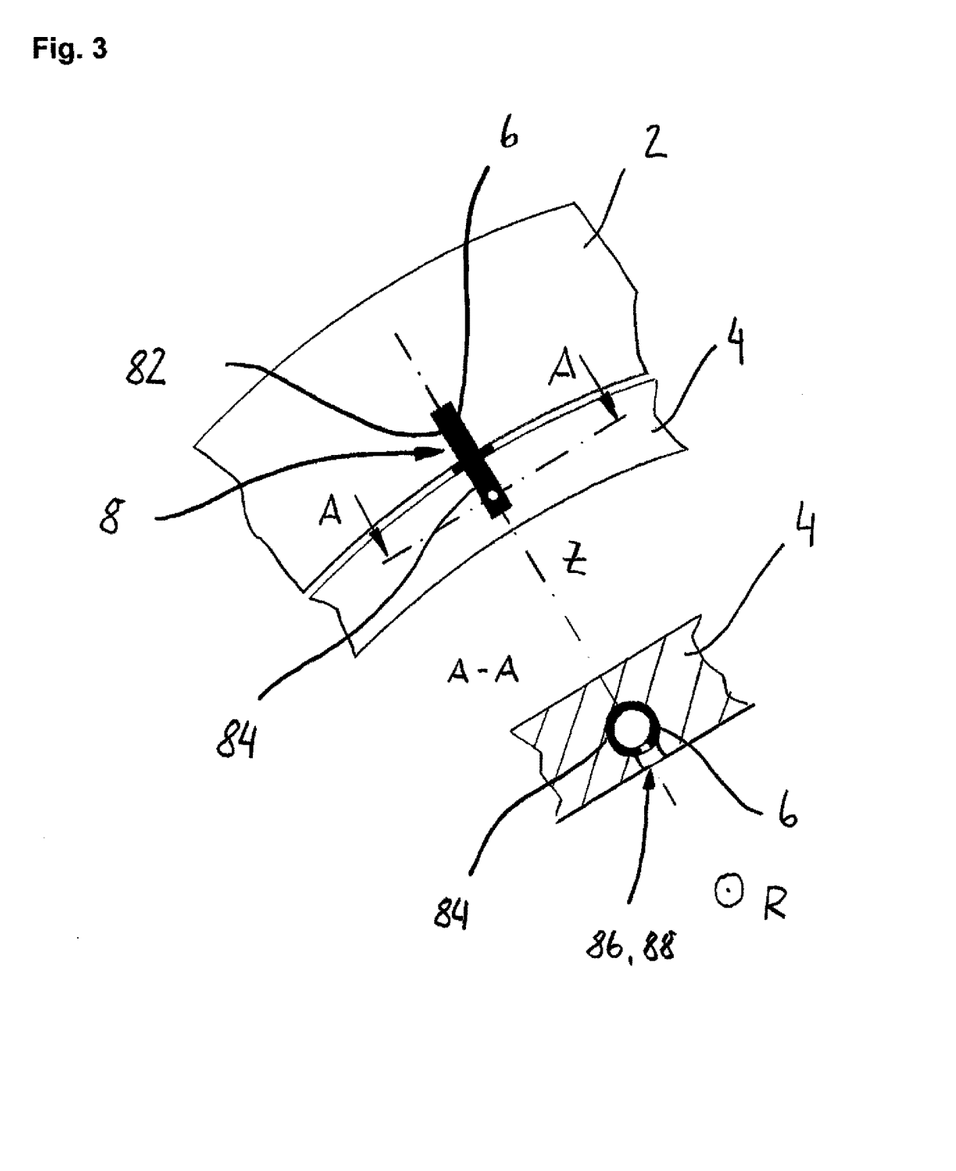
FIG. 3 shows a view and a partial section of a further preferred embodiment of the brake disc arrangement.

FIG. 3 shows a further preferred embodiment of the brake disc arrangement. A cutout of the brake disc arrangement in the direction of the rotational axis R and a partial section in the area of the mounting adapter 4 along the axis A-A are shown. The contour 8 or the friction ring-side contour region 82 and the adapter-side contour region 84 are accessible in the direction of the rotational axis R. The friction ring-side contour region 82 is closed axially to the rotational axis R in the direction of the outer diameter of the friction ring 2. Likewise, the adapter-side contour region 84 is limited axially to the rotational direction R towards the inner diameter of the mounting adapter 4. The connecting element 6 in the first state thereof can be arranged in the contour 8 via the opening region 86 shown in section A-A. Preferably, the connecting element 6 is arranged such that the opening of the connecting element 6 can be reached via the access region 88. In a preferred embodiment, the access region 88 and the opening region 86 are configured identical In the sectional view A-A, the connecting element 6 is shown in the second state thereof. There is a form-fit and/or friction-fit connection with the contour 8. The section A-A shows that the connecting element 6 and the friction ring-side contour region 82 and the adapter-side contour region 84, i.e. the contour 8, have to be designed relative to each other such that the connecting element 6 in the first state thereof can be arranged through the opening region 86 into the contour 8.

Figure 4A:
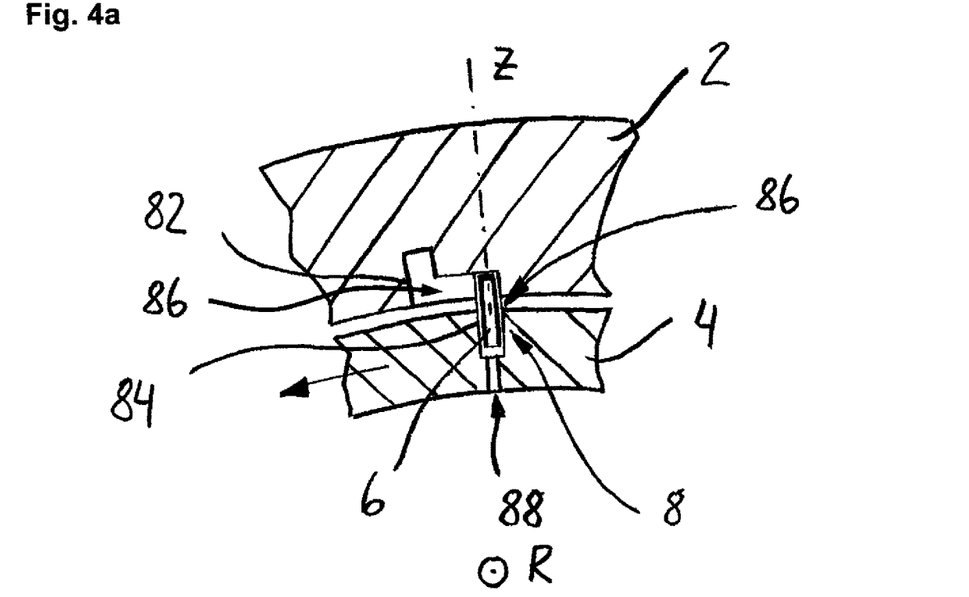
FIG. 4a shows a sectional view of a further preferred embodiment of the brake disc arrangement in the first state.
Figure 4B:
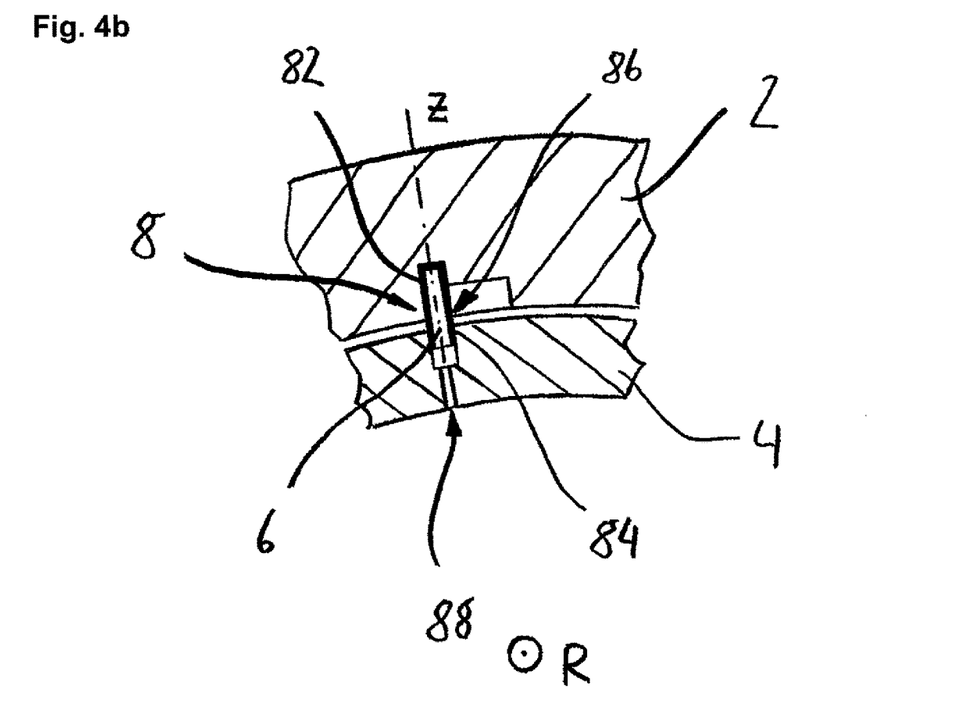
FIG. 4b shows a sectional view of the further preferred embodiment of the brake disc arrangement in the second state.

FIG. 4a shows a further preferred embodiment of the brake disc arrangement. In the preferred embodiment, the connecting element 6 departing from the outer diameter of the mounting adapter 4 can be arranged radially in the adapter-side contour region 84. To put it differently, at least one connecting element 6 can be inserted or put into at least one adapter-side contour region 84. The friction ring 2 can be arranged irrespective of this process. To put it differently, the friction ring 2 is positioned towards the mounting adapter 4 only when the connecting element 6 is arranged in the adapter-side contour region 84. In the preferred embodiment, the opening region 86 of the friction ring-side contour region 82 is configured such that the connecting element 6 can be arranged axially in the direction of the rotational axis R in the opening region 86 and may be guided to the friction ring-side contour region 82 via said opening region 86. In the preferred embodiment, this may be done via a rotational movement of the friction ring 2 and/or of the mounting adapter 4. Only by displacing the connecting element 6 into the friction ring-side contour region 82, finally the contour 8 is formed, which serves for producing a form-fit and/or friction-fit connection with the connecting element 6. When the connecting element 6 is arranged in the contour 8, it is not or only slightly possible to rotate the friction ring 2 and the mounting adapter 4 relative to each other. FIG. 4b shows the arrangement of the connecting element 6 in the second state of the contour 8. The opening of the connecting element 6 is accessible via the contour region 88. In further preferred embodiments, at least one friction ring-side contour region 82 has the geometry of the adapter-side contour region 84 shown in FIG. 4b and vice versa.

Figure 5A:
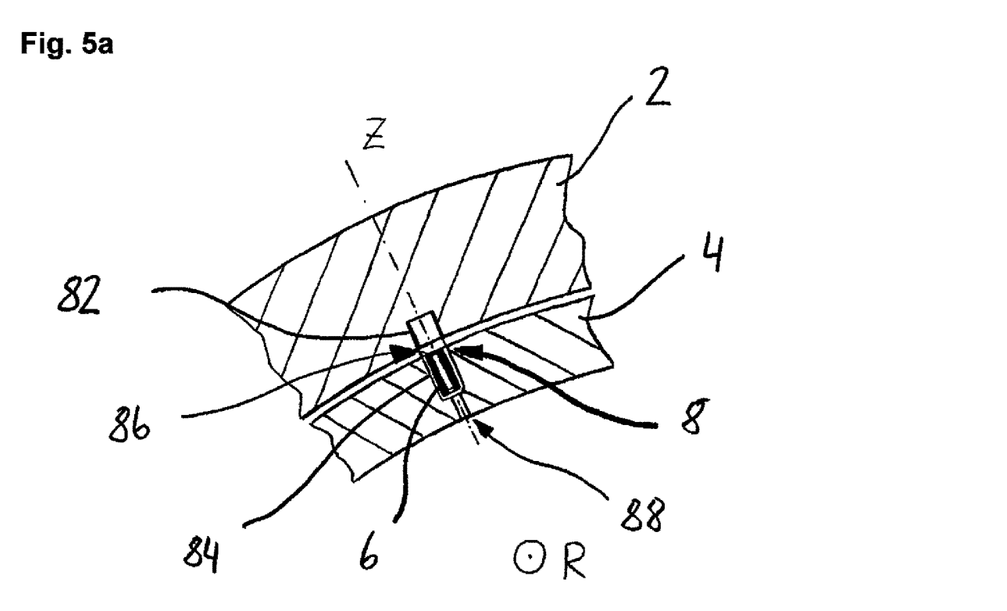
FIG. 5a shows a sectional view of a further preferred embodiment of the brake disc arrangement in the first state.
Figure 5B:
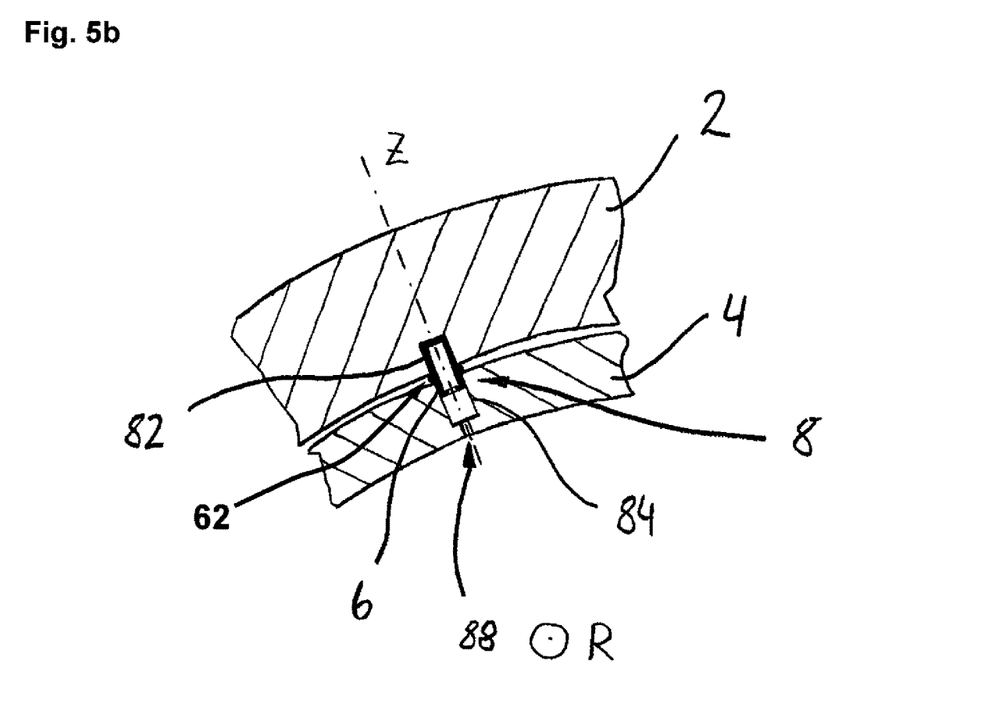
FIG. 5b shows a sectional view of a further preferred embodiment of the brake disc arrangement in the second state.

FIG. 5a shows a further preferred embodiment of the brake disc arrangement. In the the embodiment shown, the adapter-side contour region 84 is formed such that it may completely encompass the connecting element 6 in the first state thereof. Before the connecting element 6 is formed or shaped, it is at first displaced into the friction ring, i.e. into the friction ring-side contour region 82. This state is shown in FIG. 5b. There is further indicated a small bulge 62, which is formed by the connecting element 6 in the second state thereof between the friction ring 2 and the mounting adapter 4. Preferably, besides the form-fit and/or friction-fit connection of the connecting element 6 and the contour region 8, this prevents that the connecting element 6 displaces along the longitudinal axis Z in addition to the form-fit and/or friction-fit connection. In further preferred embodiments, at least one friction ring-side contour region 82 has the geometry of the adapter-side contour region 84 shown in FIG. 5*a* and vice versa.

Figure 6:
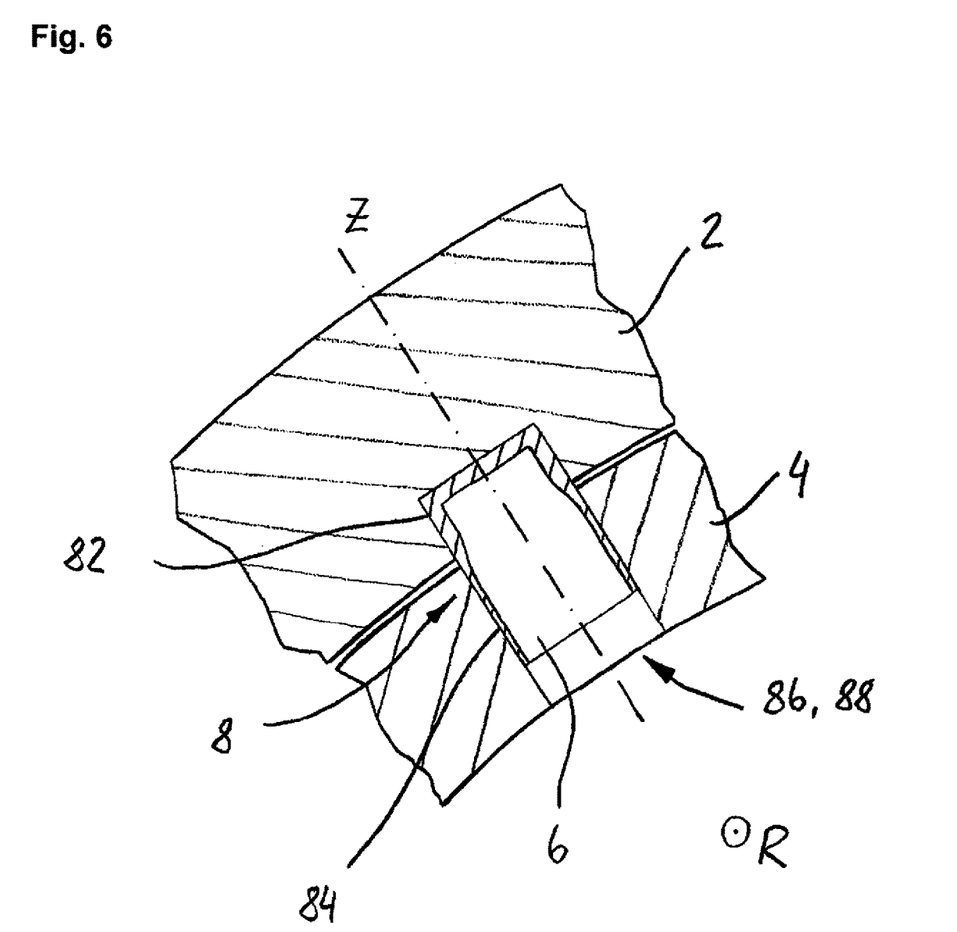
FIG. 6 shows a sectional view of a further preferred embodiment of the brake disc arrangement.

FIG. 6 shows as further preferred embodiment of the brake disc arrangement. In the preferred embodiment, the connecting element 6 is designed such that the inner diameter thereof in the friction ring-side contour region 82 is smaller than in the adapter-side contour region 84. To put it differently, the wall thickness of the connecting element 6 in the friction ring-side contour region 82 is larger than in the adapter-side contour region 84. It is of great advantage that the connecting element 6 in the friction ring-side contour region 82 forms a different form fit and/or friction fit than in the adapter-side contour region 84. Thus, it is possible to allow for a radial movability of the friction ring 2 transverse to the rotational axis R in relation to the connecting element 6, whereby it can be prevented that the friction ring opens up.

Figure 7:
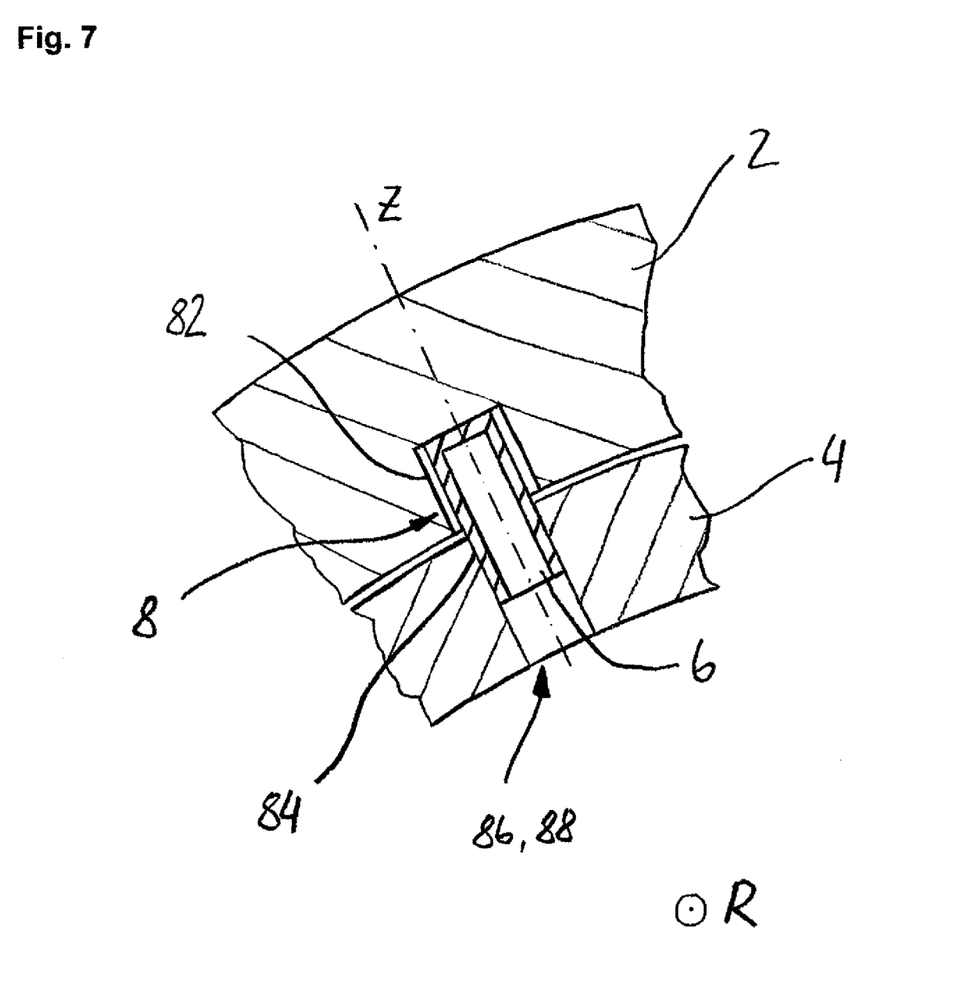
FIG. 7 shows a sectional view of a further preferred embodiment of the brake disc arrangement.

FIG. 7 shows a further preferred embodiment of the brake disc arrangement. What is shown is the connecting element 6 in the first state thereof. It becomes apparent that the connecting region 86 and the adapter-side contour region 84 are dimensioned just that the connecting element 6 can pass through or can be accommodated. The friction ring-side contour region 82, by contrast, circumferentially to the connecting element 6 has a clearance. Thus, it is achieved that, when the connecting element 6 transitions into the second state, i.e. when the outer diameter of the connecting element 6 transverse to the longitudinal axis Z is enlarged, a less pronounced form fit and/or friction fit is produced in the friction ring-side contour region than in the adapter-side contour region 84. Thus, also with one connecting element 6, which has a constant wall thickness along the longitudinal axis Z, a different form fit and/or friction fit along the contour 8 is possible. Further preferred embodiments also have combinations, i.e. connecting elements 6 with different wall thicknesses in certain sections, combined with contours 8, as they are formed in FIG. 7.

Figure 8:
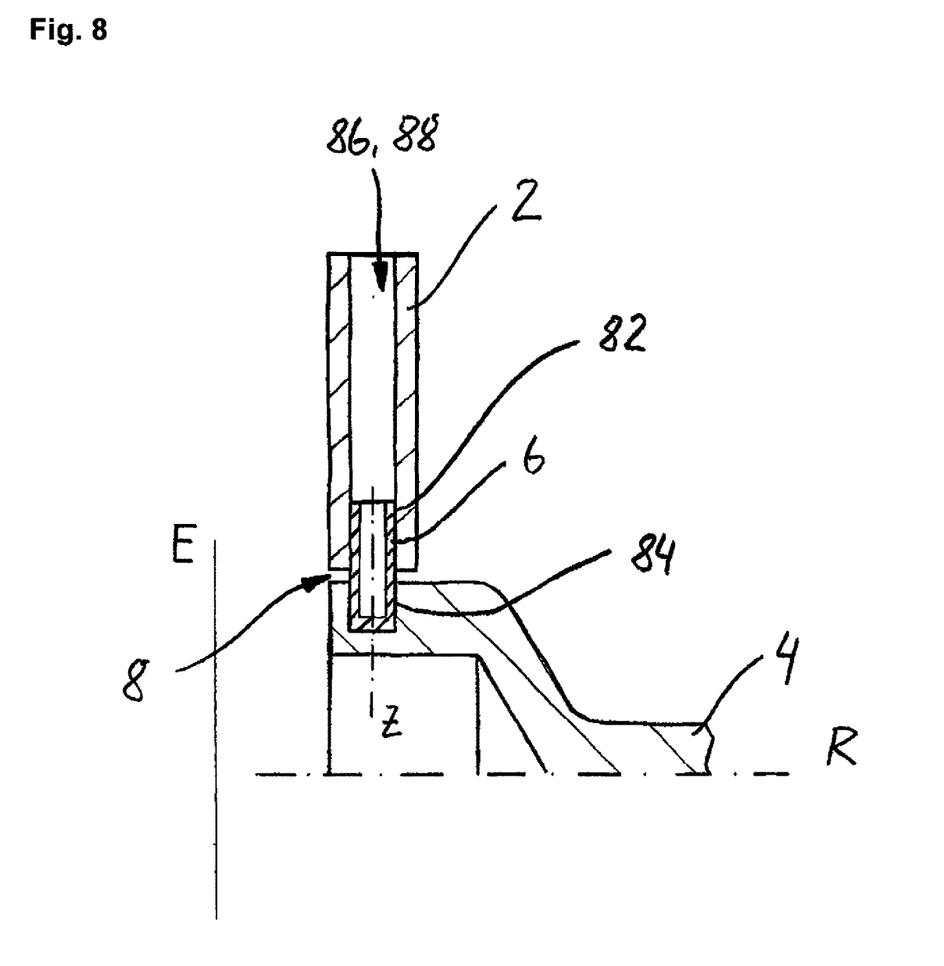
FIG. 8 shows a sectional view of a further preferred embodiment of the brake disc arrangement in a view transverse to the rotational axis.

FIG. 8 shows a further preferred embodiment of the brake disc arrangement. The mounting adapter 4 is pot-shaped along the rotational axis R in the preferred embodiment. The plane E runs transverse or essentially transverse to the rotational axis R. Parallel to the plane E there is arranged the friction ring 2 via the connecting element 6 in the mounting adapter 4. The arrangement of the connecting element 6 in the mounting adapter 4 or in the friction ring 2 is done via the opening region 86, which is formed as an opening in the friction ring 2 running radially to the rotational axis R. Said opening region 86 also takes on the function of the access region 88, by means of which a tool or an operative medium for forming the connecting element 6 can be arranged to the opening of the connecting element 6.

LIST OF REFERENCE SIGNS

2 friction ring
4 mounting adapter
6 connecting element
62 bulge
8 contour
82 friction ring-side contour region
84 adapter-side contour region
86 opening region
88 access region
Z longitudinal axis
R rotational axis
E plane

The invention claimed is:

1. A brake disc arrangement for disc brakes, comprising:
   a friction ring;
   a mounting adapter configured to mount the brake disc arrangement on a wheel hub;
   at least one connecting element configured to connect the friction ring and the mounting adapter; and
   at least one contour having a friction ring-side and an adapter-side contour region, wherein the at least one contour is shaped along a longitudinal axis by recesses in the friction ring and the mounting adapter extending at least one of perpendicular and transverse to a rotational axis of the brake disc arrangement;
   wherein the connecting element is brought from a first state into a second state by applying a same inner pressure within the friction ring-side contour region and the adapter-side contour region of the connecting element, wherein the inner pressure is applied by at least one of hydro forming and hydro-mechanical deep drawing;
   wherein the connecting element in the first state is configured such that the connecting element may be arranged inside the contour;
   wherein at least sections of an outer diameter of the connecting element in the second state is enlarged relative to the first state in at least one of perpendicular and transverse to the longitudinal axis, such that the connecting element is connected to at least one of the friction ring-side and the adapter-side contour region by at least one of form fit and friction fit; and
   wherein the at least one of form fit and friction fit of the connecting element with the contour is adjusted due to at least one of a wall thickness that is not constant along the longitudinal axis, a diameter that is not constant along the longitudinal axis of the at least one of the friction ring-side and the adapter ring-side contour region, different inner geometries that are not constant along the longitudinal axis of the at least one of the friction ring-side and the adapter-side contour region, and different material properties of the connecting element.

2. The brake disc arrangement of claim 1, wherein the contour comprises a circular cross-section.

3. The brake disc arrangement of claim 1, wherein the contour along the longitudinal axis is limited by at least one of the friction ring and the mounting adapter such that the connecting element cannot be further displaced within the contour at least in one direction of the longitudinal axis when in the first state.

4. The brake disc arrangement of claim 1, wherein at least one of the friction ring-side and the adapter-side contour region has at least one opening region, wherein the opening region is configured as an opening in at least one of the friction ring and the mounting adapter, and wherein the opening is configured such that the connecting element in the first state can be guided through the opening and be arranged in the contour.

5. The brake disc arrangement of claim 1, wherein at least one of the friction ring-side and the adapter-side contour region has at least one access region, wherein the access region is configured as an opening in at least one of the friction ring and the mounting adapter to guide at least one of an operative medium and a tool to at least one of the contour and the connecting element so that the connecting element may be formed.

6. The brake disc arrangement of claim 1, wherein the connecting element comprises a hollow body having at least one opening, wherein the opening of the connecting element is accessible via the access region in the first state of the connecting element.

7. The brake disc arrangement of claim 1, wherein the connecting element comprises a cylindrical hollow body extending along the longitudinal axis, and wherein the hollow body is closed at one side.

8. The brake disc arrangement of claim 1, wherein the wall thickness of the connecting element varies along the longitudinal axis.

9. The brake disc arrangement of claim 8, wherein the connecting element is arranged in the contour such that the wall thickness of the connecting element in the friction ring-side contour region is larger than in the adapter-side contour region.

10. The brake disc arrangement of claim 1, wherein the connecting element in the second state is accommodated in at least one of the friction ring-side and the adapter-side contour region such that the connecting element is movable along the longitudinal axis in relation to at least one of the friction ring or to the mounting adapter.

11. A method of manufacturing a brake disc arrangement for disc brakes, comprising the steps of:
providing a friction ring and a mounting adapter, wherein the friction ring and the mounting adapter each have at least one friction ring-side and at least one adapter-side contour region, that cooperate to form a common contour;
providing a connecting element, wherein the connecting element is in a first state;
bringing at least one connecting element arranged in the contour into a second state with an inner pressure applied via an access region such that the connecting element is connected to at least one of the friction ring-side and the adapter-side contour region by at least one of form fit and force fit by applying a same inner pressure within the friction ring-side contour region and the adapter-side contour region of the connecting element, wherein the inner pressure is applied by at least one of hydro forming and hydro-mechanical deep drawing;
wherein at least sections of an outer diameter of the connecting element in the second state is enlarged relative to the first state in at least one of perpendicular and transverse to the longitudinal axis; and
wherein the at least one of form fit and friction fit of the connecting element with the contour is adjusted due to at least one of a wall thickness that is not constant along the longitudinal axis, a diameter that is not constant along the longitudinal axis of the at least one of the friction ring-side and the adapter ring-side contour region, different inner geometries that are not constant along the longitudinal axis of the at least one of the friction ring-side and the adapter-side contour region, and different material properties of the connecting element.

12. The method of claim 11, further comprising the steps of:
arranging the friction ring and the mounting adapter relative to each other in a device such that at least one common contour is formed, which extends along the longitudinal axis; and
arranging and displacing the connecting element into the contour via the opening region, wherein the connecting element is arranged in the contour such that the wall thickness of the connecting element in the friction ring-side contour region is larger than in the adapter-side contour region.

13. The method of claim 11, further comprising the steps of:
arranging at least one connecting element in at least one of the friction ring-side and the adapter-side contour region;
arranging the friction ring and the mounting adapter relative to each other in the device such that at least one common contour is formed, which extends along the longitudinal axis; and
displacing the connecting element into the contour, wherein the connecting element is arranged in the contour such that the wall thickness of the connecting element in the friction ring-side contour region is larger than in the adapter-side contour region.

14. The method of claim 11, further comprising the steps of:
arranging the connecting element in at least one of the friction ring-side and the adapter-side contour region; and
arranging the friction ring and the mounting adapter relative to each other in a device such that by rotating at least one of the friction ring and the mounting adapter the contour is formed, wherein the connecting element is arranged in the contour such that the wall thickness of the connecting element in the friction ring-side contour region is larger than in the adapter-side contour region, and wherein the connecting element is arranged such that it is no longer possible to rotate the friction ring and the mounting adapter relative to each other.

15. The brake disc arrangement of claim 1, wherein the circular cross-section of the contour is constant.

16. The brake disc arrangement of claim 2, wherein the circular cross-section of the contour is constant.

* * * * *

UNITED STATES PATENT AND TRADEMARK OFFICE
CERTIFICATE OF CORRECTION

| | | |
|---|---|---|
| PATENT NO. | : 9,651,104 B2 | Page 1 of 2 |
| APPLICATION NO. | : 14/388116 | |
| DATED | : May 16, 2017 | |
| INVENTOR(S) | : Olaf Drewes | |

It is certified that error appears in the above-identified patent and that said Letters Patent is hereby corrected as shown below:

In the Specification

Column 3, Line 55:
After "may" insert -- be --

Column 5, Line 31:
"form-fit" should be — form fit —

Column 9, Line 46:
"a" (2nd occurrence) should be — an —

Column 10, Line 11:
"identical" should be — identically. —

Column 10, Line 49:
"contour region 88" should be — access region 88 —

Column 10, Line 54:
Delete "the" (2nd occurrence)

Column 11, Line 4:
"as" should be — a —

Column 11, Lines 13, 30, 34:
"form fit and/or friction fit" should be — form-fit and/or friction-fit —

Signed and Sealed this
Third Day of October, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,651,104 B2

In the Claims

Column 12, Claim 1, Line 19:
"hydro forming" should be — hydro-forming —

Column 12, Claim 1, Lines 30, 31:
"form fit . . . friction fit" should be — form-fit . . . friction-fit —

Column 12, Claim 1, Line 36:
"adapter ring-side" should be — adapter-side —

Column 13, Claim 11, Line 36:
"form fit . . . force fit" should be — form-fit . . . friction-fit —

Column 13, Claim 11, Line 40:
"hydro forming" should be — hydro-forming —

Column 13, Claim 11, Line 43:
"is" should be — are —

Column 13, Claim 11, Line 46:
"form fit . . . friction fit" should be — form-fit . . friction-fit —

Column 13, Claim 11, Line 51:
"adapter ring-side" should be — adapter-side —